(12) United States Patent
Konded et al.

(10) Patent No.: US 8,781,398 B2
(45) Date of Patent: Jul. 15, 2014

(54) METHOD AND APPARATUS TO TRANSFER FILES BETWEEN TWO TOUCH SCREEN INTERFACES

(75) Inventors: Vikas Shankar Konded, Bangalore (IN); Ravi Rajan, Bangalore (IN); Sreenivasa Sundapalyam Lakshminarayana, Bangalore (IN); Vanitha R Harish, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 351 days.

(21) Appl. No.: 12/889,225

(22) Filed: Sep. 23, 2010

(65) Prior Publication Data

US 2012/0077436 A1    Mar. 29, 2012

(51) Int. Cl.
*H04B 7/00* (2006.01)
*G06F 15/16* (2006.01)

(52) U.S. Cl.
USPC .......................................... 455/41.2; 709/228

(58) Field of Classification Search
USPC ........................................ 455/41.2; 709/228
See application file for complete search history.

(56) References Cited

U.S. PATENT DOCUMENTS

| | | | |
|---|---|---|---|
| 2006/0256074 A1* | 11/2006 | Krum et al. | 345/156 |
| 2007/0198848 A1* | 8/2007 | Bjorn | 713/186 |
| 2008/0113619 A1* | 5/2008 | Torrance et al. | 455/41.2 |
| 2009/0262069 A1 | 10/2009 | Huntington | |
| 2009/0265470 A1 | 10/2009 | Shen et al. | |
| 2010/0299390 A1* | 11/2010 | Alameh et al. | 709/204 |
| 2011/0081923 A1* | 4/2011 | Forutanpour et al. | 455/457 |
| 2011/0083111 A1* | 4/2011 | Forutanpour et al. | 715/863 |
| 2011/0261058 A1* | 10/2011 | Luo | 345/441 |
| 2011/0314168 A1* | 12/2011 | Bathiche et al. | 709/228 |

FOREIGN PATENT DOCUMENTS

| | | | |
|---|---|---|---|
| JP | 2001067321 | * | 3/2001 |
| WO | 2009024881 A1 | | 2/2009 |
| WO | 2011041434 A1 | | 4/2011 |

\* cited by examiner

*Primary Examiner* — Gennadiy Tsvey

(57) ABSTRACT

Systems and methods for configuring transferring a file between wireless communication devices are presented. The source device receives an input via a touch screen interface. It queries a destination device to determine if the destination device has received an input via the destination device's touch screen interface that completes a file transfer gesture. The source device transfers the file based on the response of the destination device to the query.

25 Claims, 7 Drawing Sheets

METHOD AND APPARATUS TO TRANSFER FILES BETWEEN TWO TOUCH SCREEN INTERFACES

BACKGROUND

1. Field of the Invention

The invention relates generally to wireless communication networks. In one embodiment, the invention relates to systems and methods for transferring files between devices with touch screen interfaces.

2. Related Art

Mobile devices such as mobile phones and media playing devices have become ubiquitous. One feature of some of these devices is the ability to transfer a file from one device to another. However, this file transfer process has traditionally been cumbersome. In particular, transferring a file may involve selecting a file to transfer, searching for a device to transfer the file to, selecting the device to transfer the file to, and accepting the file transfer at the destination device. It is desirable to transfer files between devices without the cumbersome operations present in the methods of the prior art. Therefore, what is needed is a system and method that overcomes these significant problems found in the conventional systems as described above.

SUMMARY

In one aspect, touch screens on wireless communication devices are used to facilitate wireless file transfers. First and second devices with touch screen inputs are brought within communication range of each other. As described below, the devices may communicate with each other directly via a protocol such as Bluetooth® or indirectly through a wireless router or access point. To initiate a file transfer, a user touches the touch screen of the device acting as the originator and selects a media file. This may be accomplished, for example, by placing a finger, such as a thumb, over an icon of the desired media file. The user then touches the touch screen of the destination device with another finger, e.g., his index finger. The originating and destination devices cooperate to move the indicated file to the second device by wireless communication responsive to the pair of touches. As a result, the hand of the user moving the file appears to be a connection for moving the file to the second, destination device. Advantageously, this process for transferring files enhances the user experience and allows for quick, secure file transfers.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for transferring files between wireless communication devices having touch screen interfaces. In particular, gestures and protocols for initiating file transfer are disclosed. For example, one method disclosed herein allows the initiation of a file transfer responsive to coordinated gesture on the touch screens of two devices. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
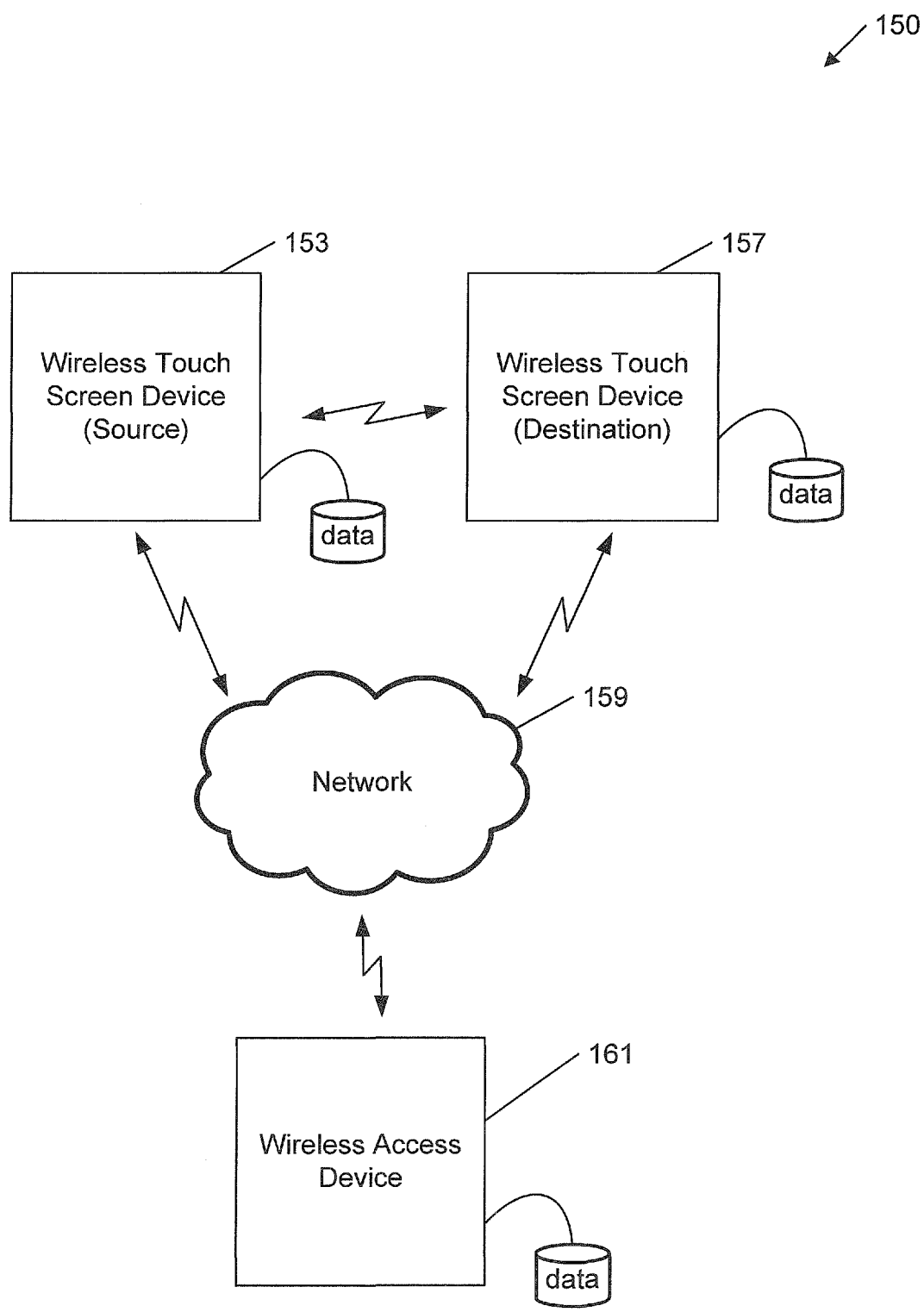
FIG. 1A is a functional block diagram illustrating an example wireless communication system that may be used in conjunction with various embodiments described herein.

FIG. 1A is a functional block diagram illustrating an example wireless communication system 150 that may be used in conjunction with various embodiments described herein. The system 150 comprises a wireless touch screen device 153 that acts as a source for the file to be transferred. The network further comprises a second wireless touch screen device 157 that acts as a destination for the file to be transferred. For ease of explanation, the device 153 may be referred to as a source device. Similarly, the device 157 may be referred to as a destination device. It will be further appreciated that while the present embodiment is described in relation to touch screen interfaces, other types of user interfaces could also be used. For example, a keypad interface could also be used according to the methods described herein. The network 150 may also comprise a wireless access device 161. In some embodiments, the source and destination devices 153 and 157 may communicate directly using a protocol such as Bluetooth®. However, in other embodiments, the source and destination devices 153 and 157 may communicate through a network such as the network 159. In another embodiment, the device 153 and 157 may also communicate via a wireless access device 161 such as a Wi-fi hotspot or access point. As described in greater detail below, according to one embodiment, the source and destination devices communicate information regarding their inputs from their respective touch screen interfaces in order to initiate and conduct file transfers in an efficient and user friendly manner. Advantageously, by sharing input information, the devices 153 and 157 reduce the effort required by the user to transfer a file.

Figure 1B:
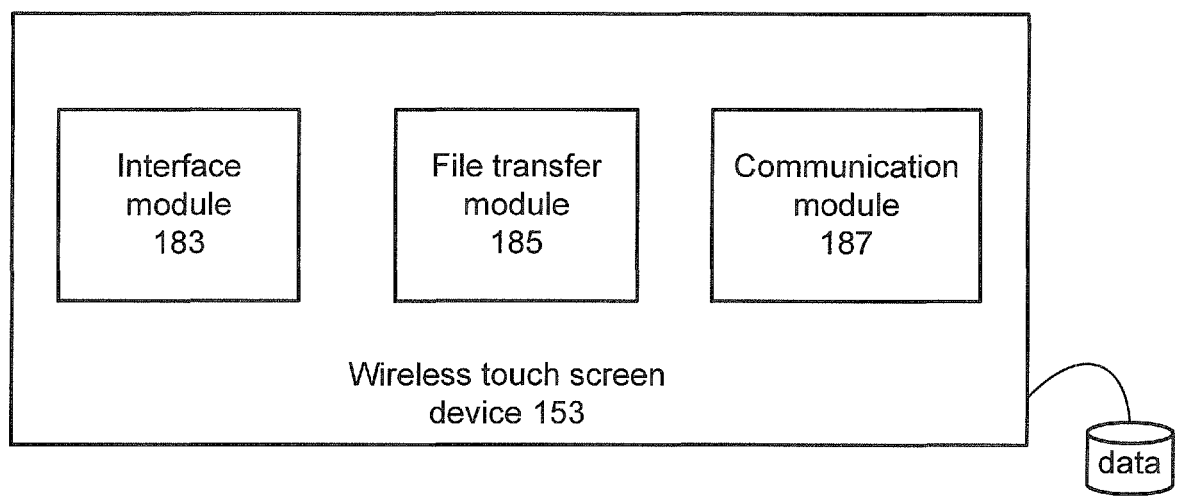
FIG. 1B is a functional block diagram illustrating an example wireless communication device having a touch screen that may be used in connection with various embodiments described herein.

FIG. 1B is a functional block diagram illustrating an example wireless touch screen device 153. The illustrated wireless touch screen device 153 may be similar to the wireless touch screen devices 153 and 157 of FIG. 1A. The wireless touch screen device 153 comprises an interface module 183, a file transfer module 185, and a communication module 187. The modules 183, 185, and 187 operate in conjunction to achieve the functionality described herein. The interface module 183 is configured to receive and process input from a user interface such as a touch screen interface. For example, in one embodiment, wireless touch screen device 153 may be configured to display a set of files that can be transferred. A user of the device may press the touch screen interface in a position that reflects a selection of one or more of the files. The interface module is configured to receive the input from the user interface and determine the corresponding one or more files that have been selected. In other embodiments, the touch screen interface may also comprise additional functionality. For example, the touch screen may also comprise a sensor for detecting temperature or for scanning fingerprints. As described in greater detail below, by collecting biometric or other physical measurements, the security of the file transfer system may be further enhanced. In embodiments where additional sensors are used, the interface module receives the sensor measurements and stores them in conjunction with the other input, e.g., file selection, received via the touch screen.

The file transfer module 185 operates in conjunction with the interface module to enable the file transfer process described herein. In one embodiment the file transfer module 185 determines whether or not to transfer the selected file based on communications with a destination device. For example, the file transfer module 185 may request input information from a potential destination device in order to determine if the file should be transferred. Based on the information received from the potential destination device and the information received from the interface module 183, the file transfer module 185 can approve or cancel a potential file transfer. For example, in one embodiment, the gesture for initiating a file transfer is near simultaneous input on the touch screen of both the source and destination devices. This may be accomplished using a single hand where one finger of the hand, e.g., the thumb, is pressed on the touch screen interface of the source device, and another finger of the same hand, e.g., the index finger, is pressed on the touch screen interface of the destination device. In one embodiment, responsive to information from the interface module 183 indicating that the user interface of the source device 153 has been touched, the file transfer module 185 requests that the destination device report on whether or not its touch screen was touched at the same or near the same time. Responsive to the input from the destination device, the file transfer module 185 may initiate the file transfer. In other embodiments the file transfer module may also use biometric information or other data from the destination device and the interface module 183 in order to determine whether or not to transfer one or more selected files.

The communication interface 187 works in conjunction with the file transfer module 185 and the interface module 183 in order to accomplish the file transfer functionality described herein. In one embodiment, the communication module 187 transmits and receives messages to and from the destination device. The messages may comprise requests or information responsive to requests as described herein. In one embodiment, the communication module 187 broadcasts requests or queries to identify potential destination devices. The communication module 187 may also transmit and receive messages to and from an intermediary such as the wireless access device 161 of FIG. 1A.

Figure 2:
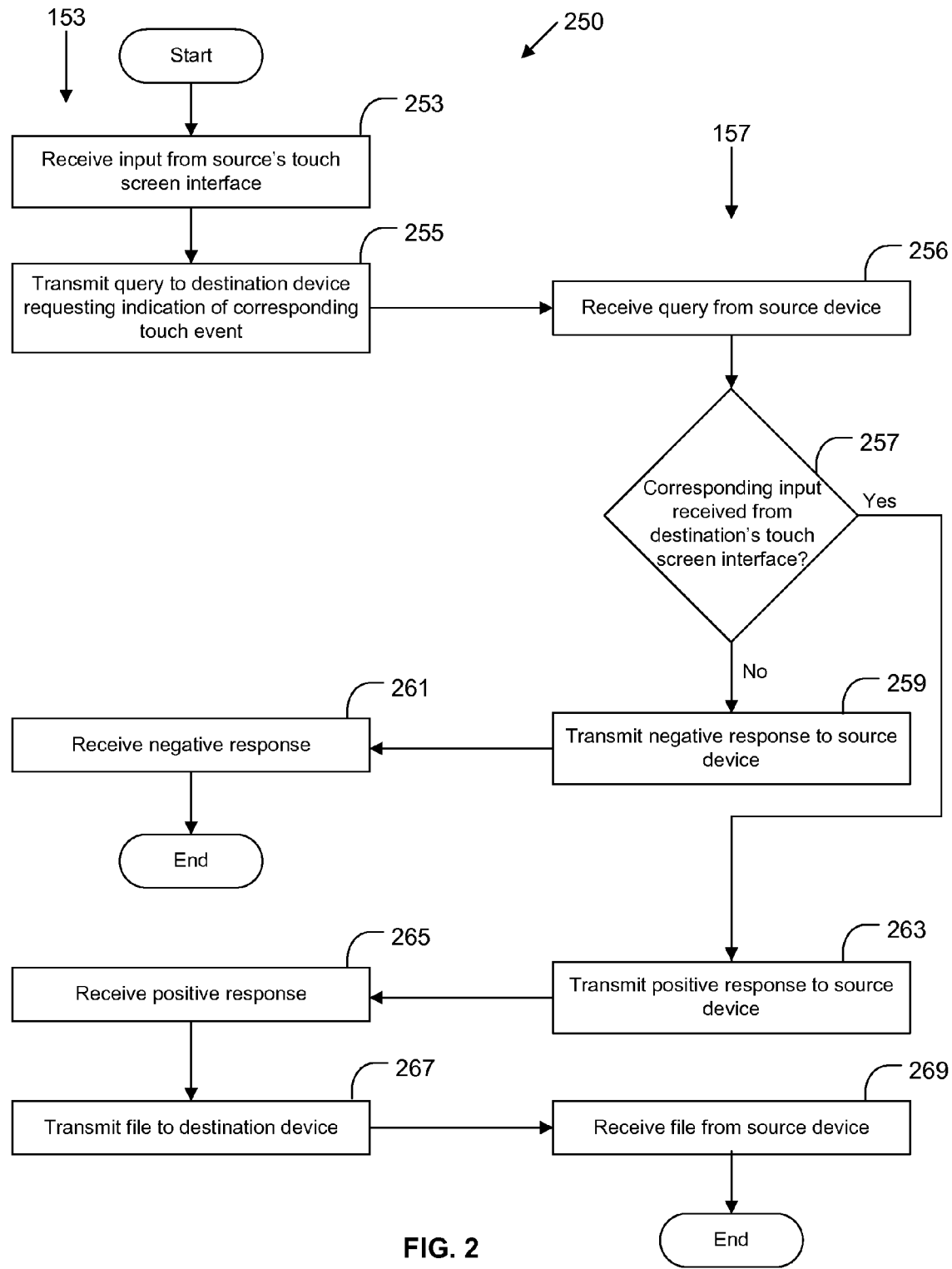
FIG. 2 is a flowchart illustrating an example communication method that can be used in conjunction with various embodiments described herein.

FIG. 2 is a flowchart illustrating an example communication method 250 that can be used in conjunction with various embodiments described herein. The method 250 is performed in part by a source device such as the source device 153 of FIG. 1A. The method 250 is also performed in part by a destination device such as the destination device 157 of FIG. 1A. In one embodiment, the method 250 may be carried out by a source device and a destination device that have been paired according to the Bluetooth® standard. In other embodiments, connections according to other standards may also be used. At step 253, the source device receives input from the source's touch screen interface. Continuing at step 255, the source device generates and transmits a query to the destination device requesting information about whether or not the destination device has also experienced a touch event. In one embodiment, the source device may include additional information in the query such as biometric information, physical measurements, timestamp information, information on the file to be transferred, information identifying the source device, or other information. At step 256, the destination device receives the query from the source device.

Continuing at decision step 257 the destination device determines whether or not it has received corresponding input from its touch screen device. As described above, one gesture for initiating a file transfer may be touching both touch screens of both the source and destination device at approximately the same time. However, it may be important to distinguish this gesture from incidental or unrelated touching of the touch screens on the devices. For the purposes of explanation, a touch at the destination device that completes a gesture for initiating a file transfer may be referred to as a corresponding input. At step 257, the destination device determines whether or not it has received input from its touch screen that corresponds to input received at the touch screen of the source device. This determination may be made in several ways. In one example, the destination device may, after receiving the query, monitors activity on its touch screen for a predetermined amount of time, e.g., a number of seconds. Alternatively, a different threshold amount of time may be used. The threshold may be based on user input or other factors. If an input is received during this monitoring period, the destination device determines that a corresponding input has been received.

In another example, after receiving the query from the source device, the destination device determines the last input received via its touch screen interface. The last input received may be characterized, for example, by a timestamp indicating the time at which the last input via the touch screen was received. In one embodiment, the destination device may determine that it has received a corresponding input if the timestamp of the last touch screen input is sufficiently close in time to the receipt of the query, e.g., a number of seconds.

In another example, the query received by the destination device may contain information about the touch screen input received at the source device. For example, the query may include a timestamp indicating when the touch screen input at the source device was received. The destination device can compare the timestamp information in the query to the timestamp information of touch screen input at the destination in order to determine if a corresponding input has been received. For example if the time stamp of the input from the source device is within a certain period of time, e.g., a number of seconds, with respect to the last or next input at the destination device, the destination device may determine that it has received a corresponding input.

In another example, the query may contain other information about the input received at the source device. For example, the query may contain biometric information such as fingerprints or other information such as a temperature measurement associated with the input. The destination device may use these other types of information to determine if a corresponding input has been received. For example, in one embodiment, the query may comprise fingerprint information for one or more fingers used for input at the source device. The destination device can compare fingerprint information for input at its touch screen against the fingerprint information in the query. If the fingerprint information matches, the destination device may determine that it has received a corresponding input.

It will be appreciated that one or more of these ways for determining whether or not a corresponding input has been received may be combined. For example, biometric data may be used in conjunction with timestamp information in order to perform the determination. Further, while the method 250 shows that the determination of a corresponding input is made by the destination device, it will be appreciated that in other embodiments, the determination may be made at the source device. For example, in response to the query from the source device, the destination device may transmit information about it recent touch screen inputs to the source device. This information may include timestamp information, biometric information, physical measurements, or other information. The source device may then determine whether a corresponding input was received at the destination device according to one or more of the ways described herein.

If the result of the decision step 257 is that no corresponding input to complete a file transfer gesture has been received at the destination device, the method 250 proceeds to step 259. At step 259, the destination device transmits a negative response to the source device indicating the lack of a corresponding input. At step 261, the source device receives the negative response and the method 250 concludes. In one embodiment, rather than terminating the method, the source device may respond to a negative response by resubmitting its query to the destination device one or more times. In another embodiment, the source device may display a message to the user indicating a failure of the file transfer.

Returning to decision step 257, if the destination device determines that it has received a corresponding input, the method 250 proceeds to step 263. At step 263, the destination device transmits a positive response to the source device. At step 265, the source device receives the positive response. At step 267, responsive to the positive response, the source device transmits the file to the source device. At step 269, the destination device receives the file from the source device and the file transfer process is completed. In one embodiment, the transferred file is stored at the destination device in a non-transitory computer readable medium. The location of the transferred file on the destination device may be selected by a user of the destination device or may default to a predetermined location.

Figure 3:
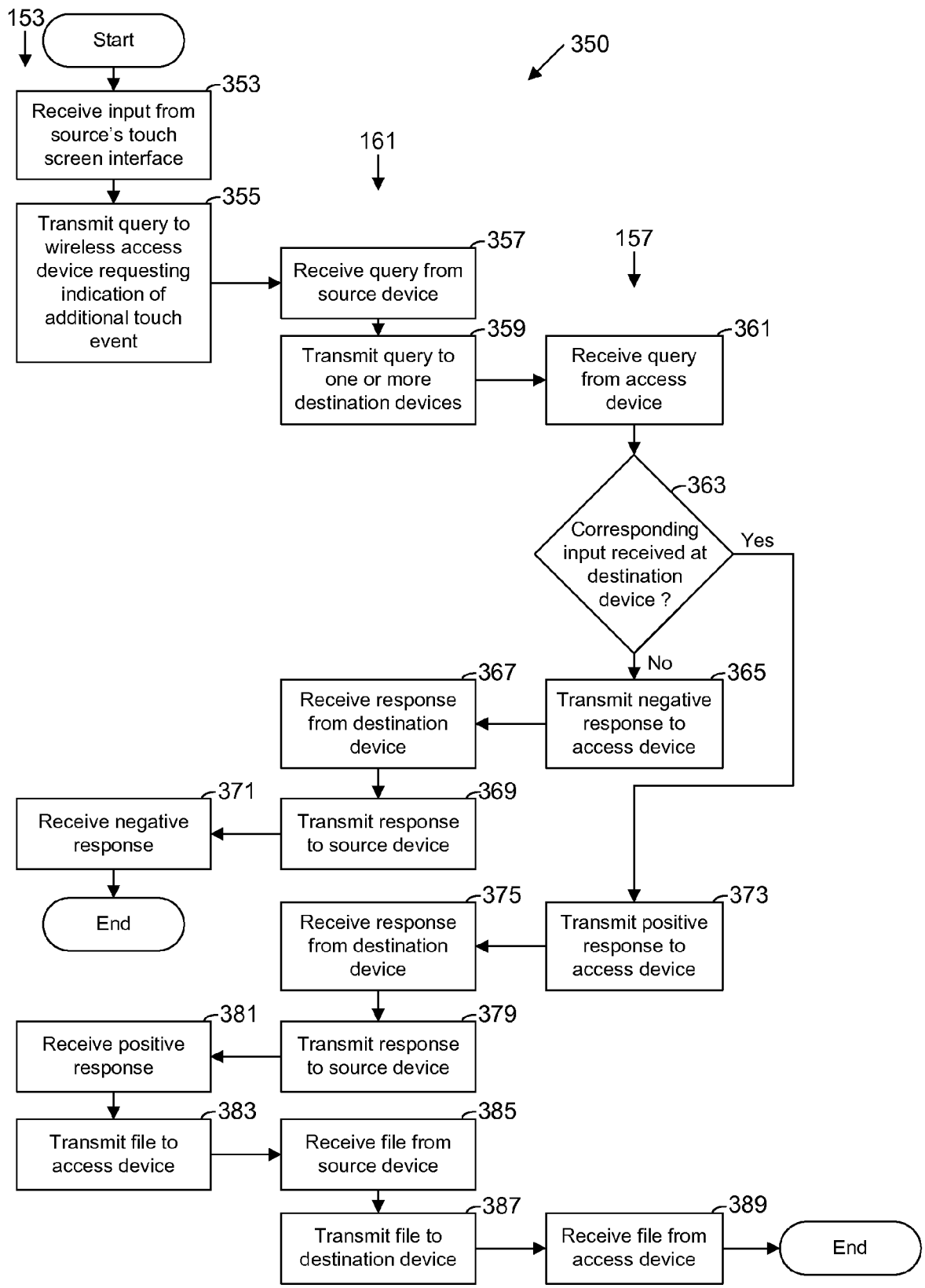
FIG. 3 is a flowchart illustrating another example communication method that can be used in conjunction with various embodiments described herein.

FIG. 3 is a flowchart illustrating an example communication method 350 that can be used in conjunction with various embodiments described herein. The method 350 can be performed in part by a source device such as the source device 153 of FIG. 1A. The method 350 can also performed in part by a destination device such as the destination device 157 of FIG. 1A. The method 350 can also be performed in part by a wireless access device such as the wireless access device 161 of FIG. 1A. In one embodiment, the method 350 may be carried out by a source device and a destination device that communicate with a wireless access device according to the IEEE 802.11 standards. In other embodiments, connections according to other standards may also be used.

At step 353, the source device receives input from the source's touch screen interface. This step may be similar to step 253 of FIG. 2, described above. Continuing at step 355, the source device generates and transmits a query to the wireless access device requesting information about whether or not any other devices in proximity to the source device has also experienced a touch event. In contrast to the method 250, in the method 350, the source device does not communicate directly with the destination device. Further, at this stage of the method, the source device may not know any communication characteristics of the destination device, e.g., its address used for communication with the wireless access device. Accordingly, the request may not specify any particular destination device. In one embodiment, the source device may include additional information in the query such as biometric information, physical measurements, timestamp information, information on the file to be transferred, information identifying the source device, communication characteristics of the source device, or other information.

Continuing at step 357, the wireless access device receives the query from the source device. At step 359, the wireless access device transmits the query to one or more destination devices. As noted above, because the communication parameters of the eventual destination device may be unknown, the wireless access device may send the query to more than one potential destination device. In one embodiment, the wireless access device may transmit the query to every device connected to the wireless access device. In another embodiment, the wireless access device limits the number of destination devices that receive the query. For example, the wireless access device may limit the number of destination devices according to physical proximity to the source device or by device type. If the query is transmitted to multiple potential destination devices, the steps associated with the destination device 157 in FIG. 3 may be performed by each of the potential destination devices.

Continuing at step 361, the destination device receives the query from the wireless access device. At decision step 363, the destination device determines whether it has received a corresponding input. This step may be similar to the step 257 of FIG. 2. In particular, the destination device may use information in the query in conjunction with information from its own touch screen interface in order to determine if it has received a corresponding gesture. Alternatively, the destination may respond to the query by generating and transmitting a response containing information received via the touch screen interface at the destination device so that the source device can determine if a corresponding input has been made. For example, the source device may receive an input corresponding to the first half of a transfer gesture. The source device may record timestamp information in conjunction with the input corresponding to the first half of the transfer gesture. The source device may then transmit a request, via the access device, to one or more potential destination devices. Each potential destination device may monitor its input for a predetermined amount of time to determine if any inputs are potential second halves of the transfer gesture. If a particular potential destination device detects a potential second half of the transfer gesture, the particular device records the gesture input and timestamp information. This information can then be returned to the source device via the access device. The source device can then compare its stored gesture information with the gesture information from the particular potential destination device to determine if a complete transfer gesture has occurred. Further, the source device can compare the timestamp information to determine if the two gestures occurred within a threshold amount of time, e.g., a few seconds. In one example, if both these conditions are satisfied, the source device determines that a corresponding gesture has been made and that the file transfer should proceed.

If no corresponding input has been received, the method 350 proceeds to step 365. At step 365, the destination device generates and transmits the negative response to the query to the wireless access device. At step 367, the wireless access device receives the negative response. At step 369 the access device transmits the negative response to the source device. At step 371, the source device receives the negative response. The step 371 may be similar to the step 261 of FIG. 2.

Returning to decision step 363, if the destination device determines that a corresponding input has been received, the method 350 proceeds to step 373. At step 373 the destination device generates and transmits a positive response to the query from the wireless access device. At step 375, the access device receives the positive response. At step 379, the wireless access device transmits the positive response to the source device. The transmission to the source device may also include other information, such as an address of the destination device used for communication with the access device. At step 381, the source device receives the positive response. At step 383, the source device transmits the file to be transferred to the wireless access device responsive to the positive response. The transmission to the access device may also include other information such as the address of the destination device. At step 385 the access device receives the file to be transferred. It will be appreciated that the entire file may not be stored at or transferred through the access device at one time. Rather, data from the file may be transferred in portions through the access device until the entire file has been transferred. However, for the purposes of explanation, the word file is used. At step 387 the access device transmits the file to be transferred to the destination device. At step 389, the destination device receives the file to be transferred and the method 350 ends.

Figure 6:
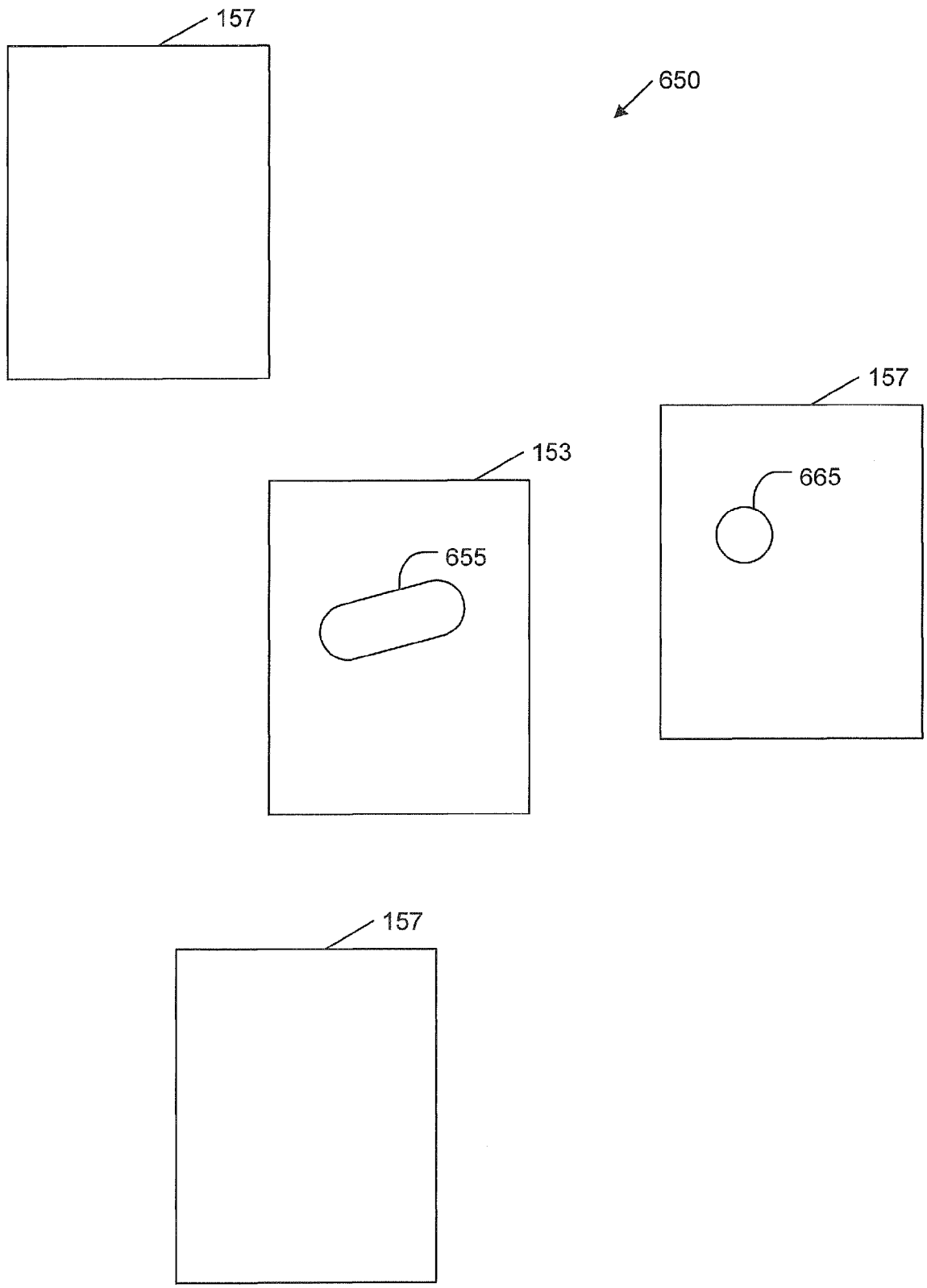
FIG. 6 is a functional block diagram illustrating an example wireless communication system that may be used in conjunction with various embodiments described herein.

FIG. 6 is a functional block diagram illustrating an example wireless communication system 650 that may be used in conjunction with various embodiments described herein. System 650 includes a source device 153 a plurality of destination devices 157. The source device 153 and destination devices 157 may be similar to the source device 153 and destination devices 157 of FIGS. 1A and 1B. In some embodiments, the source device 153 may be able to communicate with one or more potential destination devices 157 when transferring a file. However, a user of the source device 153 may only want to transfer a file to one of the destination device 157. Thus, it may be beneficial to distinguish between a plurality of potential destination devices 157. In particular it may be advantageous to have a way to distinguish between inputs at the destination devices that are intended to complete a transfer gesture and those inputs that are incidental. As described above, one method of accomplishing this is to use a form of biometric verification or other physical property to compare inputs on the source and destination devices. Another method is to compare timestamp information to compare inputs. However, as illustrated in FIG. 6. another method may be to use information about the gestures themselves. For example, the input at the source device 153 may be a swipe gesture 655. As shown the swipe gesture 655 is directed in an approximate line towards one of the potential destination devices 157. Further, the input gesture destination 665 at the destination device 157 is a touch that lies in the approximate line of the input swipe gesture 655. In one embodiment, the source or destination device may determine that a transfer gesture has been completed based on comparison of the gestures and on relative position or orientation of the gestures and the devices. For example, the source device may determine that a transfer gesture has been completed when the touch input 665 at the destination device 157 is in line with the swipe gesture 655 at the source device. In this manner, even if similar touches were made at one or more other potential destination devices, those touches would not be interpreted as completing the transfer gesture because such inputs would not be in line with the swipe input 655. In one embodiment the source and destination devices may comprise components such as gyroscopes, accelerometers, GPS equipment, or other components which allow the devices to determine absolute or relative position and orientation. The source device may be configured to initiate a file transfer based, at least in part, on a comparison of position or orientation information associated with input at the source and destination devices.

Figure 7:
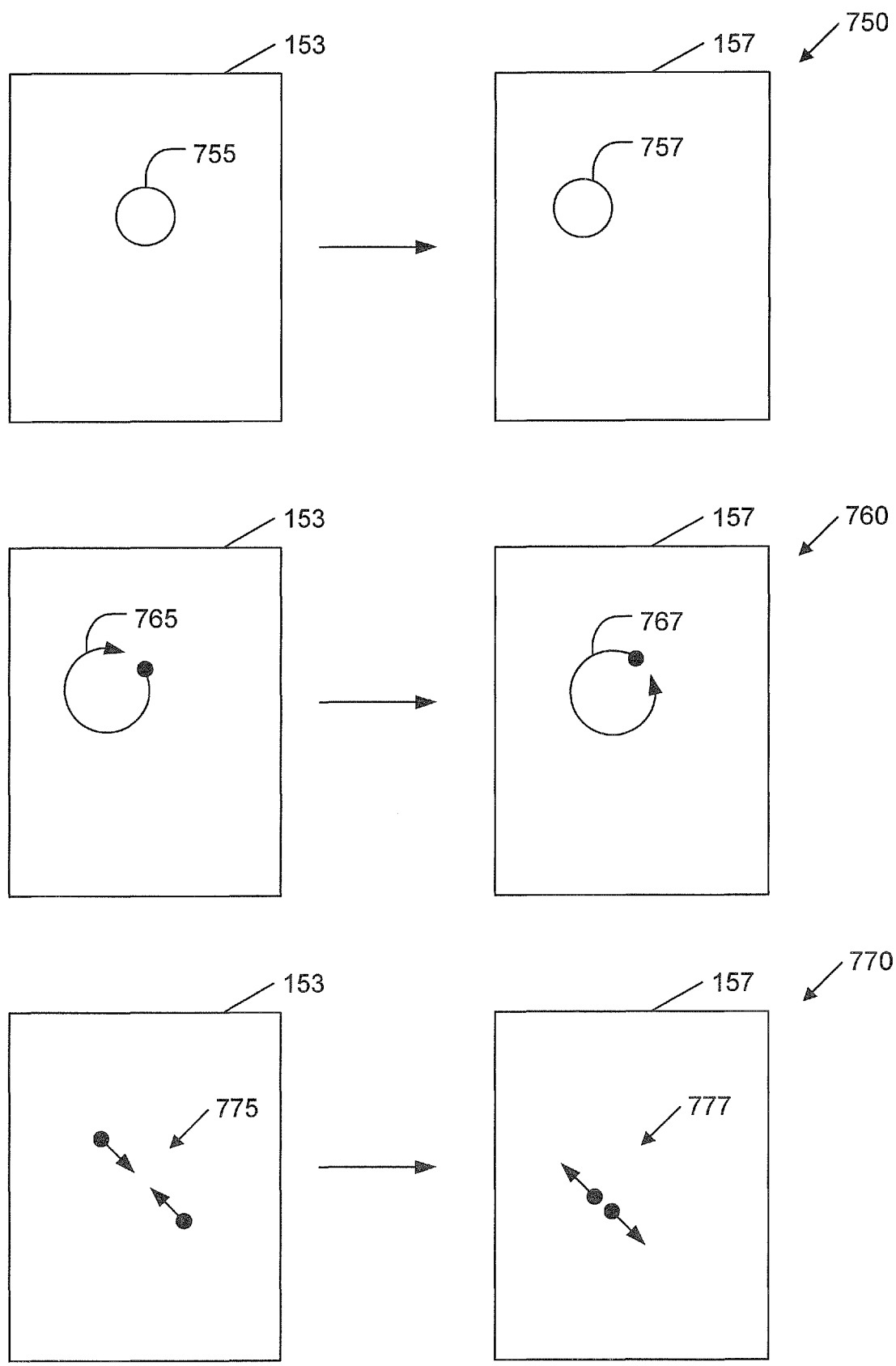
FIG. 7 is a functional block diagram illustrating example wireless communication systems that may be used in conjunction with various embodiments described herein.

FIG. 7 is a functional block diagram illustrating example wireless communication systems 750, 760, and 770 that may be used in conjunction with various embodiments described herein. As described above, a file transfer between two wireless devices having touch screen interfaces may be accomplished in response to a first input at a source device and a corresponding second input at a destination device. The inputs may be referred to respectively as source and destination gestures. The combination of a source gesture and a corresponding destination gesture may be referred to as a file transfer gesture. FIG. 7 illustrates additional file transfer gestures that may be used in conjunction with various embodiments described herein.

System 750 illustrates a first input 755 at a source device 153 and a second input 757 at a destination device 157. In one embodiment, the first input 755 is a tap and hold input. For example, a user may apply a finger to the touch screen and leave his or her finger applied to the screen of the source device 153. In one embodiment, the second input 757 is also a tap and hold gesture. In this embodiment, the system 750 may determine that a file transfer has been completed when simultaneous tap and hold gestures are performed on both the source 153 and destination 157 devices. For example, a threshold of one second may be used. If tap and hold gestures overlap on both the source 153 and destination 157 devices for the length of the threshold, the source 153 or destination 157 device may determine that the file transfer gesture has been completed. It will be appreciated that other thresholds can be used. Advantageously, by using a threshold and overlapping inputs, the system 750 can decrease the likelihood of inadvertent file transfers.

It will be appreciated that the gestures 755 and 757 may be performed with fingers on the same hand, by fingers on different hands of the same user, or by fingers on the hands of different users. Further, while the other gestures have been described herein as being performed by different fingers on the same hand, it will be generally appreciated that file transfers may be initiated by fingers on different hands of the same user or different users.

System 760 illustrates another transfer gesture performed at the source device 153 and the destination device 157. The first gesture 765 at the source device comprises tracing a finger in an approximate circle in the clockwise direction. The corresponding gesture 767 at the destination device 157 comprises tracing a finger in an approximate circle in the counter-clockwise direction. Advantageously, this transfer gestures provides for significantly different inputs at the source 153 and destination 157 devices. By using different inputs, the likelihood of inadvertent file transfers can be diminished. For example, the counter clockwise input 767 at the destination device would not potentially be interpreted as an input gesture such as the input gesture 765.

System 770 illustrates another transfer gesture at the source device 153 and the destination device 157. The first gesture 775 comprises a pinch gesture where two fingers are placed on the touch screen and brought towards each other. The corresponding gesture 777 at the destination device comprises an un-pinch gesture where two fingers are placed on the touch screen and separated from each other. As with other gestures described herein, the gestures 775 and 777 advantageously provide differentiation between input and output gestures.

It will be appreciated that the gestures described herein may also be used in combination with other gestures. For example, the gesture 777 may comprise a double tap in addition to the un-pinch gesture. In another embodiment, multiple sets of transfer gestures may be used. For example, the source device 153 may be configured to identify any of a plurality of gestures, such as gestures 755, 765, or, 775 as input gestures. However, the file transfer may only be completed if the appropriate corresponding gesture is made. Thus, for example, the source device 153 may receive a pinch gesture 775 as an input. Further, the destination device 157 may receive a tap and hold gesture 757 as an input. While each of the inputs may be valid source and destination gestures, the gestures do not correspond to each other and thus do not constitute a complete file transfer gesture. Advantageously, by allowing different users to use different sets of corresponding gestures, the likelihood of inadvertent file transfers can be minimized.

Figure 4:
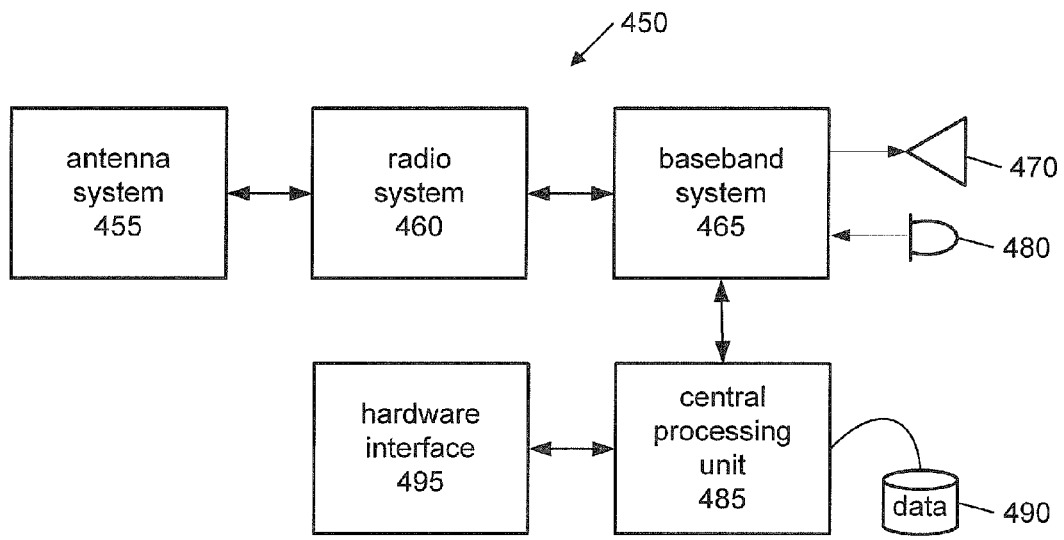
FIG. 4 is a block diagram illustrating an example wireless communication device that may be used in connection with various embodiments described herein.

FIG. 4 is a block diagram illustrating an example wireless communication device 450 that may be used in connection with various embodiments described herein. For example, the wireless communication device 450 may be implemented as the wireless touch screen devices 153 and 157 of FIGS. 1A and 1B and wireless access device 161 of FIG. 1A and may implement the functionality described in relation to those devices. However, other wireless communication devices and/or architectures may also be used, as will be clear to those skilled in the art.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) for implementing the functionality described herein.

In this description, the term "computer readable medium" is used to refer to any non-transitory media used to provide executable instructions (e.g., software and computer programs) to the wireless communication device 450 for execution by the central processing unit 485. Examples of these media include the data storage area 490, microphone 480 (via the baseband system 465), antenna system 455 (also via the baseband system 465), and hardware interface 495. These computer readable media are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 5:
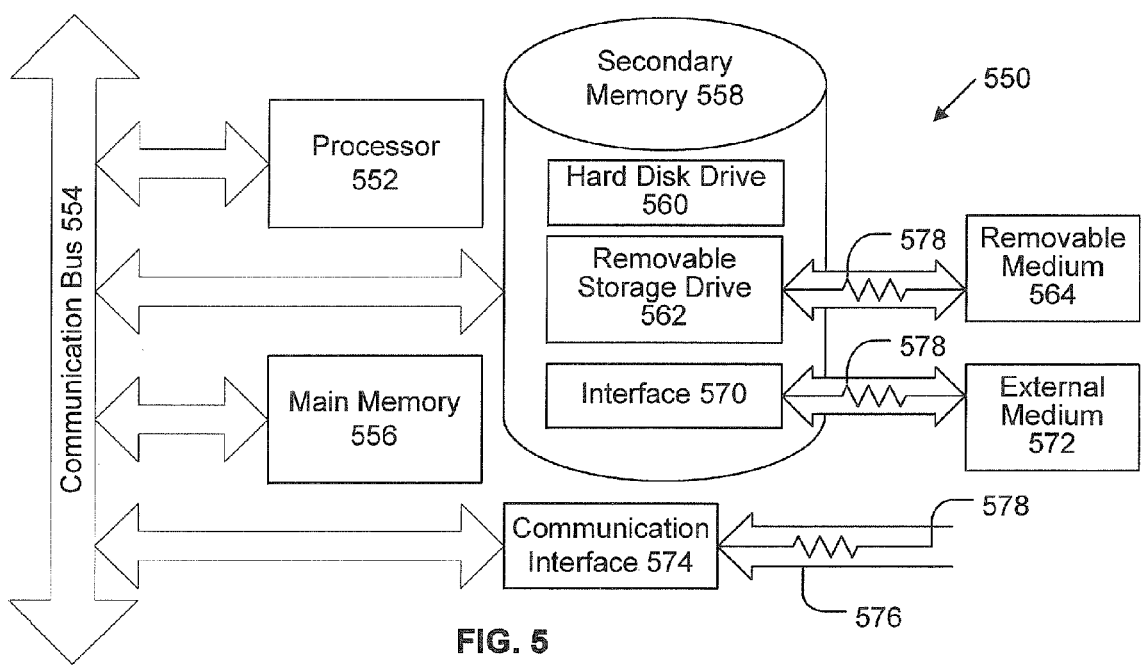
FIG. 5 is a block diagram illustrating an example computer system that may be used in connection with various embodiments described herein.

FIG. 5 is a block diagram illustrating an example computer system 550 that may be used in connection with various embodiments described herein. For example, the computer system 550 may be used in conjunction with the wireless touch screen devices and wireless access device described herein. In particular, the computer system 550 may be incorporated into the devices 153, 157, and 161 of FIG. 1A and may implement the functionality described with respect to the modules 183, 185, and 187 of FIG. 1B. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any non-transitory computer readable storage media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These non-transitory computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method, implemented in a first wireless communication device, for transferring a file to a second wireless communication device, where one or more processors are programmed to perform steps comprising:

receiving, at a first time, an input via a touch screen interface from a user;

transmitting, responsive to the input, a query to the second wireless communication device, wherein the query comprises timestamp information representing the first time and temperature information corresponding to the input;

receiving, from the second wireless communication device, either a positive response or a negative response, wherein the positive response comprises an indication that a corresponding input was received at the second wireless communication device, within a predetermined time period from the first time represented by the timestamp information, via a touch screen interface on the second wireless communication device, and wherein the negative response comprises an indication that a corresponding input was not received at the second wireless communication device, within the predetermined time period from the first time represented by the timestamp information, via the touch screen interface on the second wireless communication device;

if the positive response is received, transmitting the file to the second wireless communication device responsive to the positive response; and if the negative response is received, not transmitting the file to the second wireless communication device.

2. The method of claim 1, wherein the input comprises a touch from a first finger of a hand and the corresponding input comprise a touch from a second finger of the hand.

3. The method of claim 1, further comprising pairing with the second wireless communication device according to the Bluetooth standard.

4. The method of claim 1, wherein the query further comprises fingerprint information corresponding to the input.

5. The method of claim 1, further comprising:
displaying to the user, via the touch screen interface, one or more representations of files; and
selecting the file based, at least in part, on a location of the input on the touch screen interface.

6. The method of claim 1, wherein the transmitting the query comprises transmitting the query to the second wireless device via a wireless access device.

7. The method of claim 1, comprising transmitting, responsive to the input, the query to a plurality of wireless communication devices.

8. The method of claim 1, wherein the input received at the first wireless communication device comprises a first gesture, wherein the input received at the second wireless communication device comprises a second gesture, wherein the indication of the positive response identifies the second gesture, and wherein the method further comprises:
storing the first gesture; and,
if the positive response is received,
comparing the stored first gesture to the second gesture identified by the indication of the positive response, determining whether the first gesture is associated with the second gesture as a complete transfer gesture, and transmitting the file to the second wireless communication device only if it is determined that the first gesture is associated with the second gesture as a complete transfer gesture.

9. The method of claim 8, providing a plurality of complete transfer gestures, wherein each of the plurality of complete transfer gestures comprise an associated pair of first and second gestures.

10. The method of claim 8, wherein the first gesture comprises a first tap-and-hold gesture, wherein the second gesture comprises a second tap-and-hold gesture, and wherein determining whether the first gesture is associated with the second gesture as a complete transfer gesture comprises determining whether the first tap-and-hold gesture overlaps in time with the second tap-and-hold gesture.

11. The method of claim 8, wherein the first gesture comprises a swipe gesture, and wherein the second gesture comprises a touch that lies in an approximate line of the swipe gesture.

12. The method of claim 8, wherein the first gesture comprises a swipe in one of a clockwise direction and counter-clockwise direction, and wherein the second gesture comprises a swipe in the other one of the clockwise direction and counter-clockwise direction.

13. The method of claim 8, wherein the first gesture comprises one of a pinch gesture and an un-pinch gesture, and wherein the second gesture comprises the other one of the pinch gesture and un-pinch gesture.

14. The method of claim 1, wherein the indication of the positive response comprises timestamp information representing when the corresponding input was received.

15. A method, implemented in a first wireless communication device, for transferring a file to a second wireless communication device, where one or more processors are programmed to perform steps comprising:
receiving, at a first time, an input and first fingerprint information associated with the input via a touch screen interface from a user;
transmitting, responsive to the input, a query to the second wireless communication device;
receiving, from the second wireless communication device, information regarding one or more inputs received at the second wireless communication device via a touch screen interface on the second wireless communication device, wherein the information regarding the one or more inputs comprises timestamp information for each of the one or more inputs and second fingerprint information for each of the one or more inputs, the information regarding the one or more inputs further comprises temperature information;
comparing timestamp information representing the first time to the timestamp information for each of the one or more inputs;
comparing the first fingerprint information to the second fingerprint information for each of the one or more inputs; and
transferring a file to the second wireless communication device responsive to the comparison of the timestamp information and the comparison of the first and second fingerprint information.

16. The method of claim 15, wherein the method further comprises determining first temperature information associated with the input, wherein the information regarding the one or more inputs further comprises second temperature information, wherein the method further comprises comparing the first temperature information to the second temperature information, and wherein the transferring a file is further responsive to the comparison of the first and second temperature information.

17. The method of claim 15, further comprising pairing with the second wireless communication device according to the Bluetooth standard.

18. The method of claim 15, further comprising:
displaying to the user, via the touch screen interface, one or more files; and
selecting the file based, at least in part, on a location of the input on the touch screen interface.

19. The method of claim 15, wherein comparing the first and second fingerprint information comprises determining whether the first fingerprint information corresponds to a touch from a first finger and whether the second fingerprint information for each of the one or more of the inputs corresponds to a touch from a second finger that corresponds with the first finger.

20. The method of claim 15, wherein the transmitting the query comprises transmitting the query to the second wireless device via a wireless access device.

21. A technical system for wireless communication, the system comprising:
a non-transitory computer readable medium for storing computer executable programmed modules;
a processor communicatively coupled with the non-transitory computer readable medium for executing programmed modules stored therein;
an interface module stored in the non-transitory computer readable medium and configured to receive, at a first time, an input via a touch screen interface from a user;
a communication module stored in the non-transitory computer readable medium and configured to
transmit a query to a wireless communication device, wherein the query comprises timestamp information representing the first time and temperature information corresponding to the input, and
receive, from the wireless communication device, a response, the response may be either a positive response or a negative response,
wherein the positive response comprises an indication that a corresponding input was received at the wireless communication device, within a predetermined time period from the first time represented by the timestamp information, via a touch screen interface of the wireless communication device, and
wherein the negative response comprises an indication that a corresponding input was not received at the second wireless communication device, within the predetermined time period from the first time represented by the timestamp information, via the touch screen interface on the second wireless communication device; and
a file transfer module stored in the non-transitory computer readable medium and configured to
if the positive response is received, transfer a file to the wireless communication device responsive to the positive response, and
if the negative response is received, not transferring the file to the wireless communication device.

22. The system of claim 21, wherein the input comprises a touch from a first finger of a hand and the corresponding input comprise a touch from a second finger of the hand.

23. The system of claim 21, further comprising pairing with the wireless communication device according to the Bluetooth standard.

24. The system of claim 21, wherein the query further comprises fingerprint information corresponding to the input.

25. The system of claim 21, further comprising:
   displaying to the user, via the touch screen interface, one or more representations of files; and
   selecting the file based, at least in part, on a location of the input on the touch screen interface.

* * * * *